United States Patent
Ng et al.

(10) Patent No.: US 7,634,782 B2
(45) Date of Patent: Dec. 15, 2009

(54) REMOVABLE FRONT PANEL FOR A COMPUTER HARDWARE CHASSIS

(75) Inventors: Kai Ng, San Jose, CA (US); Guillermo Andres, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 633 days.

(21) Appl. No.: 11/040,458

(22) Filed: Jan. 20, 2005

(65) Prior Publication Data

US 2006/0161937 A1 Jul. 20, 2006

(51) Int. Cl.
- *G11B 33/02* (2006.01)
- *A47B 97/00* (2006.01)
- *G06F 1/16* (2006.01)

(52) U.S. Cl. ............... 720/657; 312/223.2; 361/385

(58) Field of Classification Search ................ 292/19, 292/80, 81, 83, 87; 312/222, 223.2; 361/681, 361/683, 685; 720/657
See application file for complete search history.

(56) References Cited

U.S. PATENT DOCUMENTS

| | | | | |
|---|---|---|---|---|
| 5,123,680 A | * | 6/1992 | Liu | 292/17 |
| 5,359,478 A | * | 10/1994 | Kawano | 360/96.6 |
| 5,392,192 A | * | 2/1995 | Dunn et al. | 361/683 |
| 5,423,605 A | * | 6/1995 | Liu | 312/265.6 |
| 5,510,957 A | * | 4/1996 | Takagi | 361/814 |
| 5,593,219 A | * | 1/1997 | Ho | 312/263 |
| 5,593,220 A | * | 1/1997 | Seid et al. | 312/265.6 |
| 5,660,297 A | * | 8/1997 | Liu | 220/4.02 |
| 5,754,396 A | | 5/1998 | Felcman et al. | |
| 5,785,398 A | * | 7/1998 | Park | 312/223.2 |
| 5,820,235 A | * | 10/1998 | Tsai | 312/223.2 |
| 5,823,644 A | * | 10/1998 | Suh et al. | 312/223.2 |
| 5,825,626 A | | 10/1998 | Hulick et al. | |
| 5,918,956 A | * | 7/1999 | Scholder | 312/223.2 |
| 5,927,386 A | * | 7/1999 | Lin | 165/80.3 |
| 5,997,115 A | * | 12/1999 | Radloff et al. | 312/222 |
| 6,053,586 A | * | 4/2000 | Cook et al. | 312/223.2 |
| 6,075,693 A | * | 6/2000 | Leman | 361/683 |
| 6,102,501 A | * | 8/2000 | Chen et al. | 312/223.2 |
| 6,143,116 A | * | 11/2000 | Hayashi et al. | 156/233 |
| 6,157,532 A | * | 12/2000 | Cook et al. | 361/681 |

(Continued)

FOREIGN PATENT DOCUMENTS

DE 3601943 A1 * 7/1987

(Continued)

OTHER PUBLICATIONS

"European Search Report", (Sep. 15, 2008), 6 pages.

*Primary Examiner*—Angel A. Castro

(57) ABSTRACT

A front panel that can be removed from and installed onto a computer hardware chassis. A computer system housing includes a chassis and a removable front panel that is removably connectable to the chassis. The chassis includes a first locking mechanism, a first structure for engaging and releasing the first locking mechanism, a second locking mechanism and a second structure for engaging and releasing the second locking mechanism. The front panel includes a first mating portion for receipt at the first locking mechanism, wherein the first mating portion is removably engaged with the first locking mechanism, and a second mating portion for receipt at the second locking mechanism, wherein the second mating portion is removably engaged with the second locking mechanism.

14 Claims, 10 Drawing Sheets

U.S. PATENT DOCUMENTS

| | | | |
|---|---|---|---|
| 6,158,105 A * | 12/2000 | Suh | 29/453 |
| 6,209,975 B1 * | 4/2001 | Lai | 312/223.2 |
| 6,234,593 B1 * | 5/2001 | Chen et al. | 312/223.2 |
| 6,266,237 B1 * | 7/2001 | Jensen et al. | 361/683 |
| 6,266,239 B1 * | 7/2001 | Cook et al. | 361/683 |
| 6,288,333 B1 * | 9/2001 | Liu et al. | 174/563 |
| 6,296,334 B1 * | 10/2001 | Liao | 312/223.2 |
| 6,297,948 B1 * | 10/2001 | Buican et al. | 361/683 |
| 6,373,690 B1 * | 4/2002 | Buican et al. | 361/683 |
| 6,375,287 B1 * | 4/2002 | Lai | 312/223.2 |
| 6,555,747 B2 * | 4/2003 | Chen et al. | 174/559 |
| 6,603,655 B2 * | 8/2003 | Hrehor et al. | 361/683 |
| 6,637,847 B2 * | 10/2003 | Crisp et al. | 312/223.2 |
| 6,671,179 B2 * | 12/2003 | Chen | 312/223.2 |
| 6,685,033 B1 * | 2/2004 | Baddour et al. | 211/26 |
| 6,899,407 B1 * | 5/2005 | Lai | 312/223.2 |
| 6,935,661 B1 * | 8/2005 | Farnsworth et al. | 292/162 |
| 7,164,080 B2 * | 1/2007 | Chen et al. | 174/50 |
| 7,166,799 B2 * | 1/2007 | Chen et al. | 174/50 |
| 7,404,610 B2 * | 7/2008 | Smith et al. | 312/223.2 |
| 2004/0085719 A1 * | 5/2004 | Huang | 361/683 |
| 2005/0062374 A1 * | 3/2005 | Chen et al. | 312/223.2 |

FOREIGN PATENT DOCUMENTS

EP       0234294 A2 *  1/1987

* cited by examiner

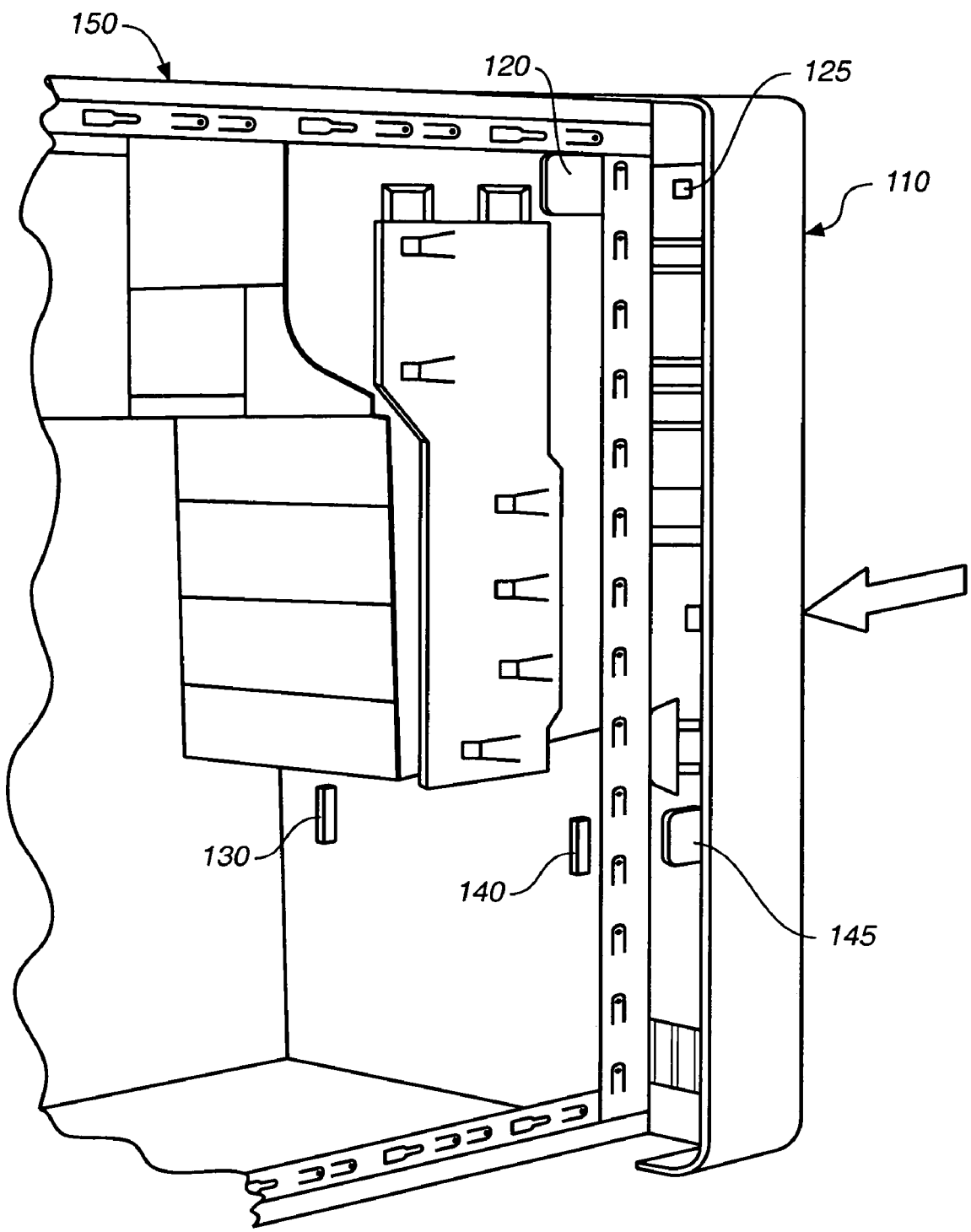
FIG._1

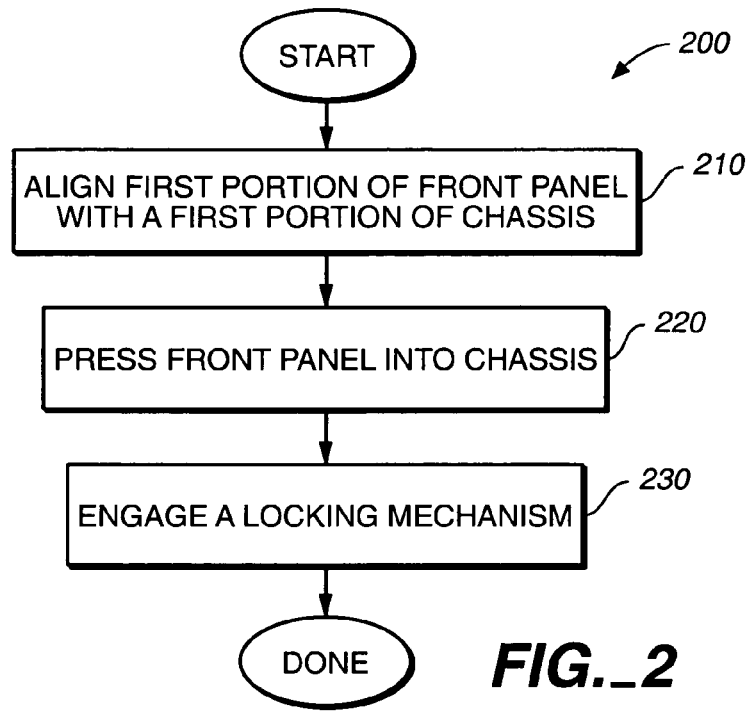
FIG._2
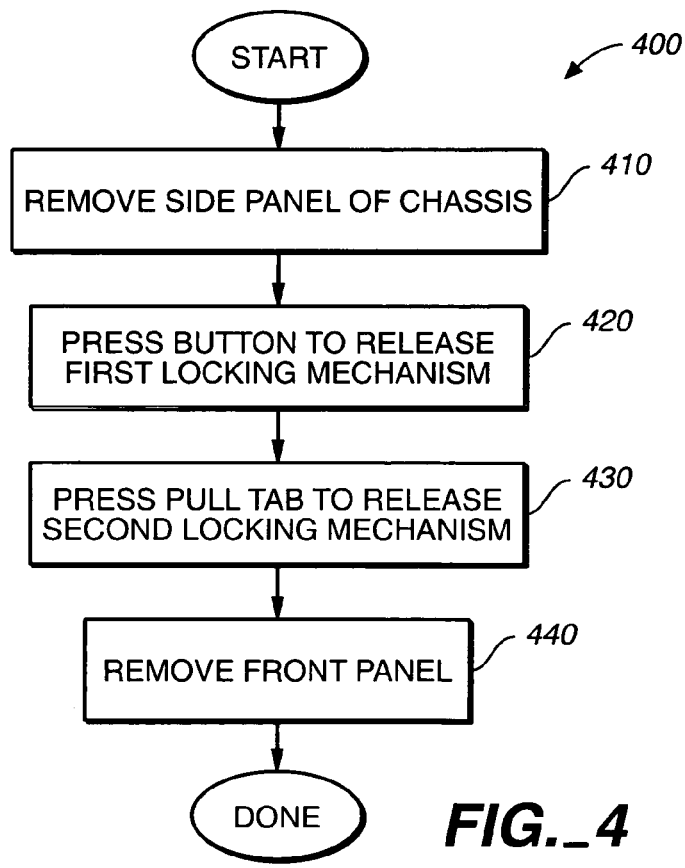
FIG._4

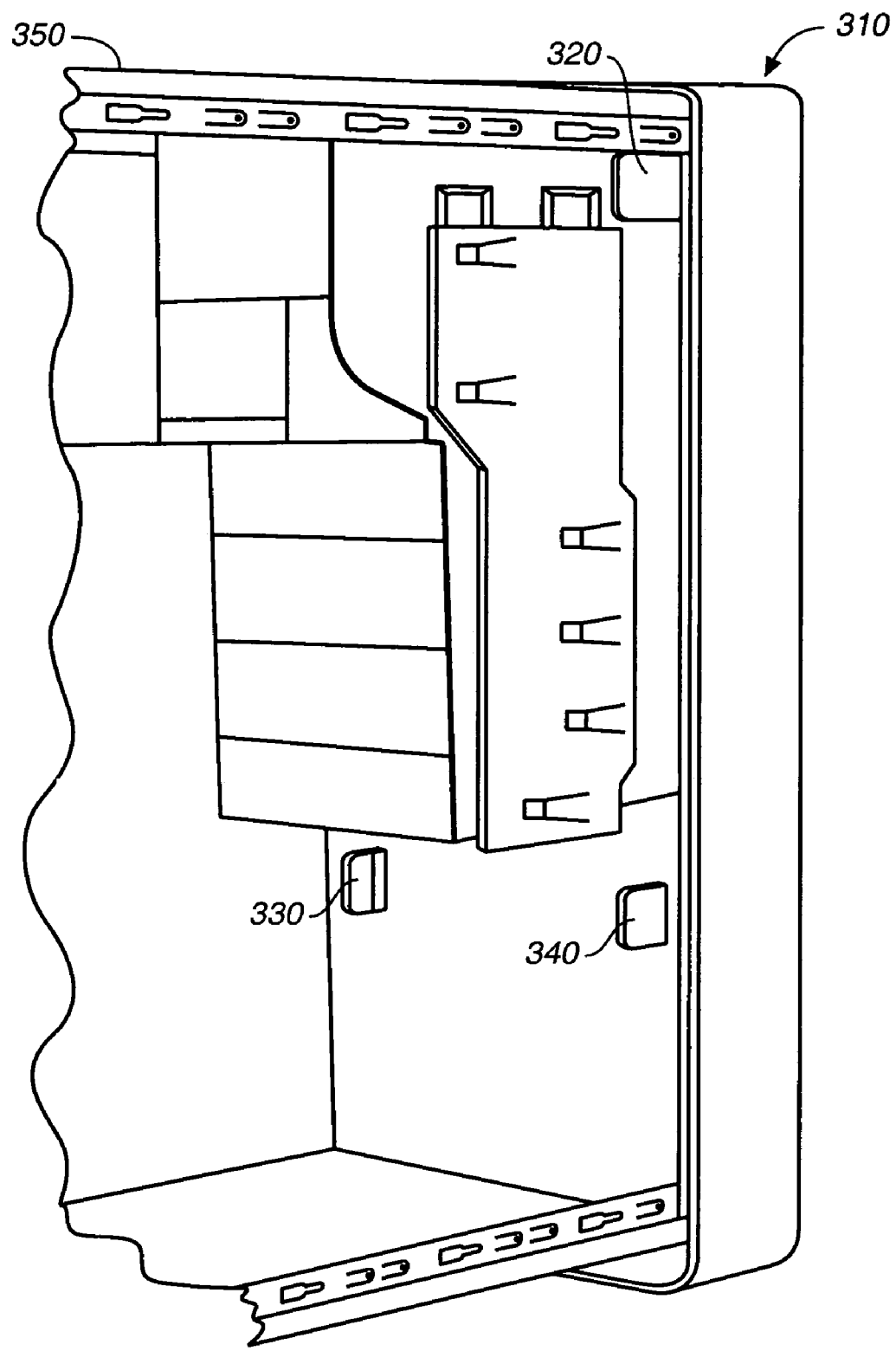
FIG._3

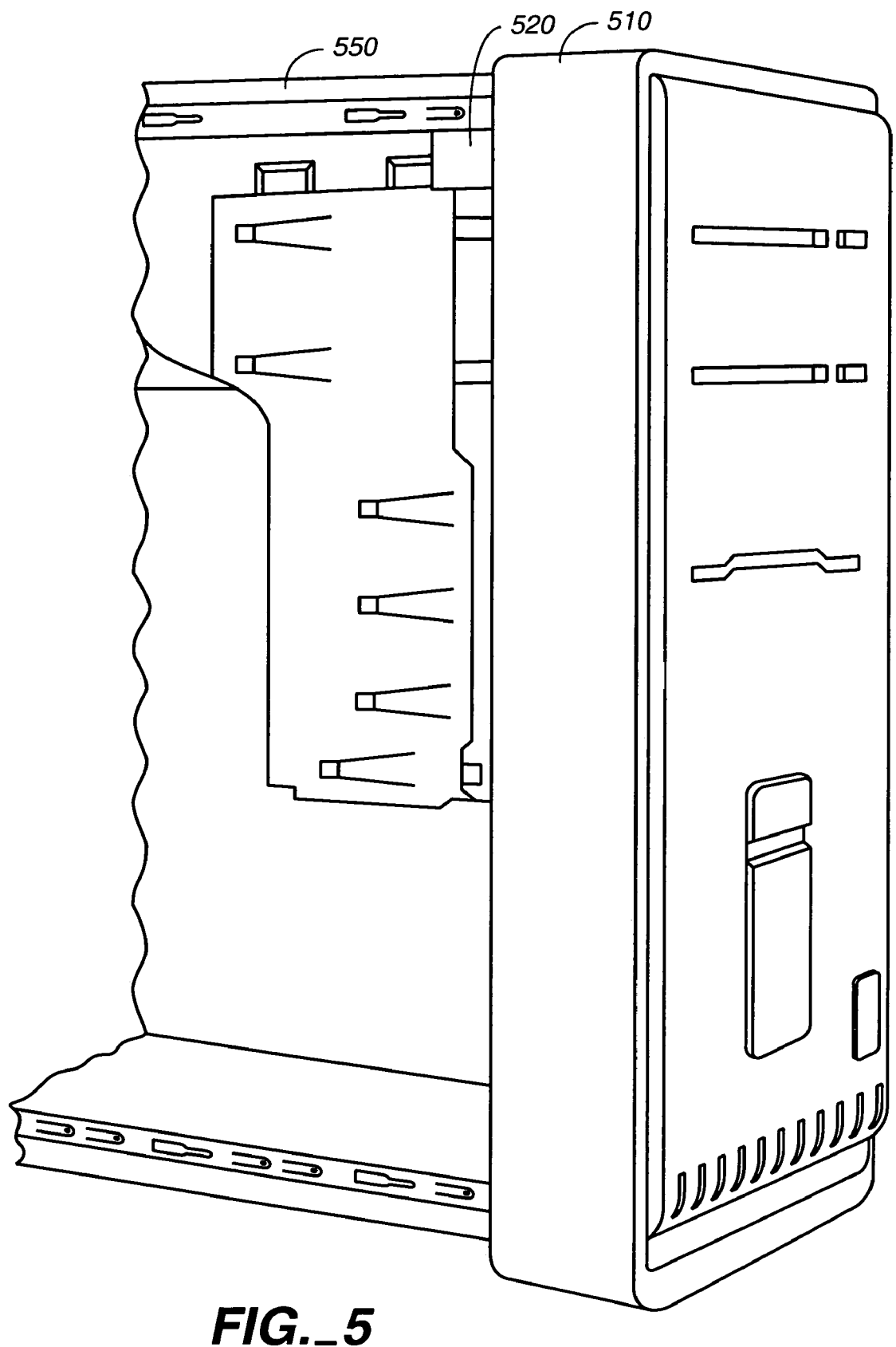
FIG._5

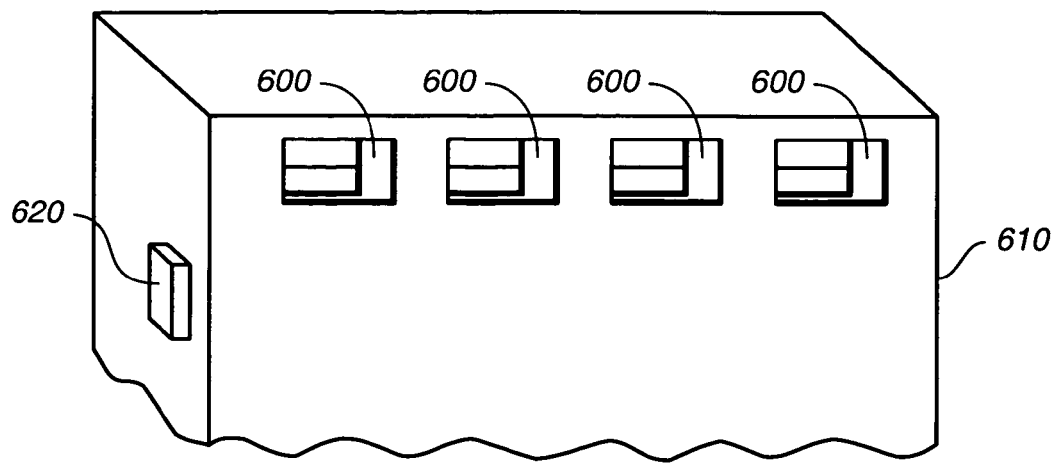
FIG._6A
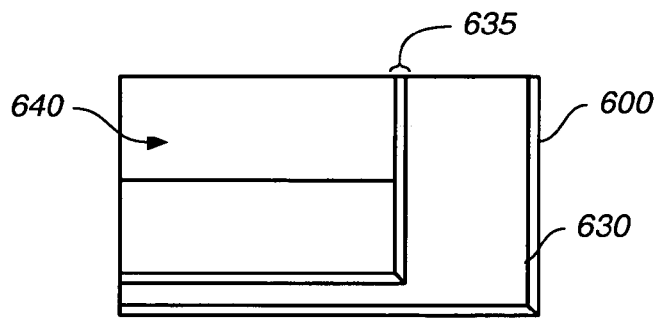
FIG._6B
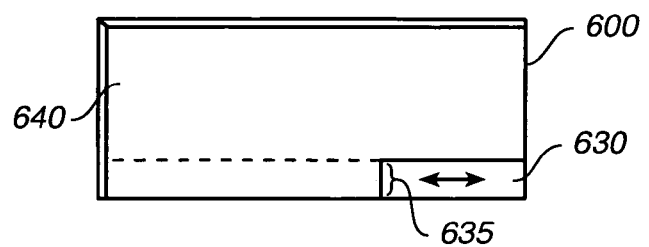
FIG._6C

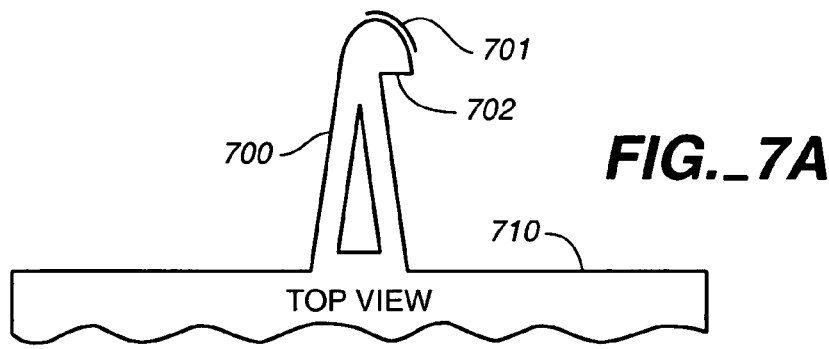
FIG._7A
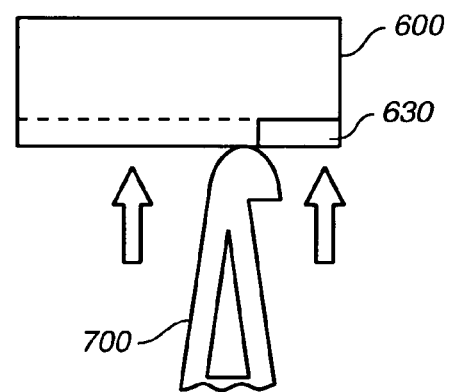
FIG._7B
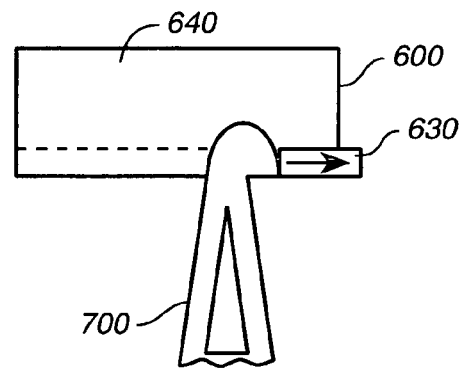
FIG._7C
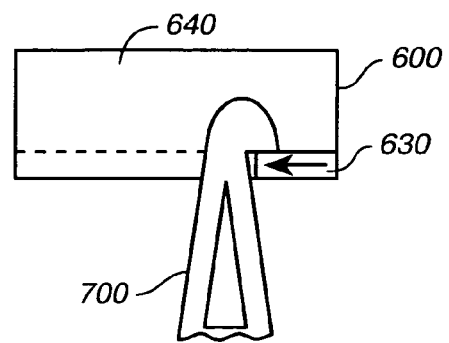
FIG._7D

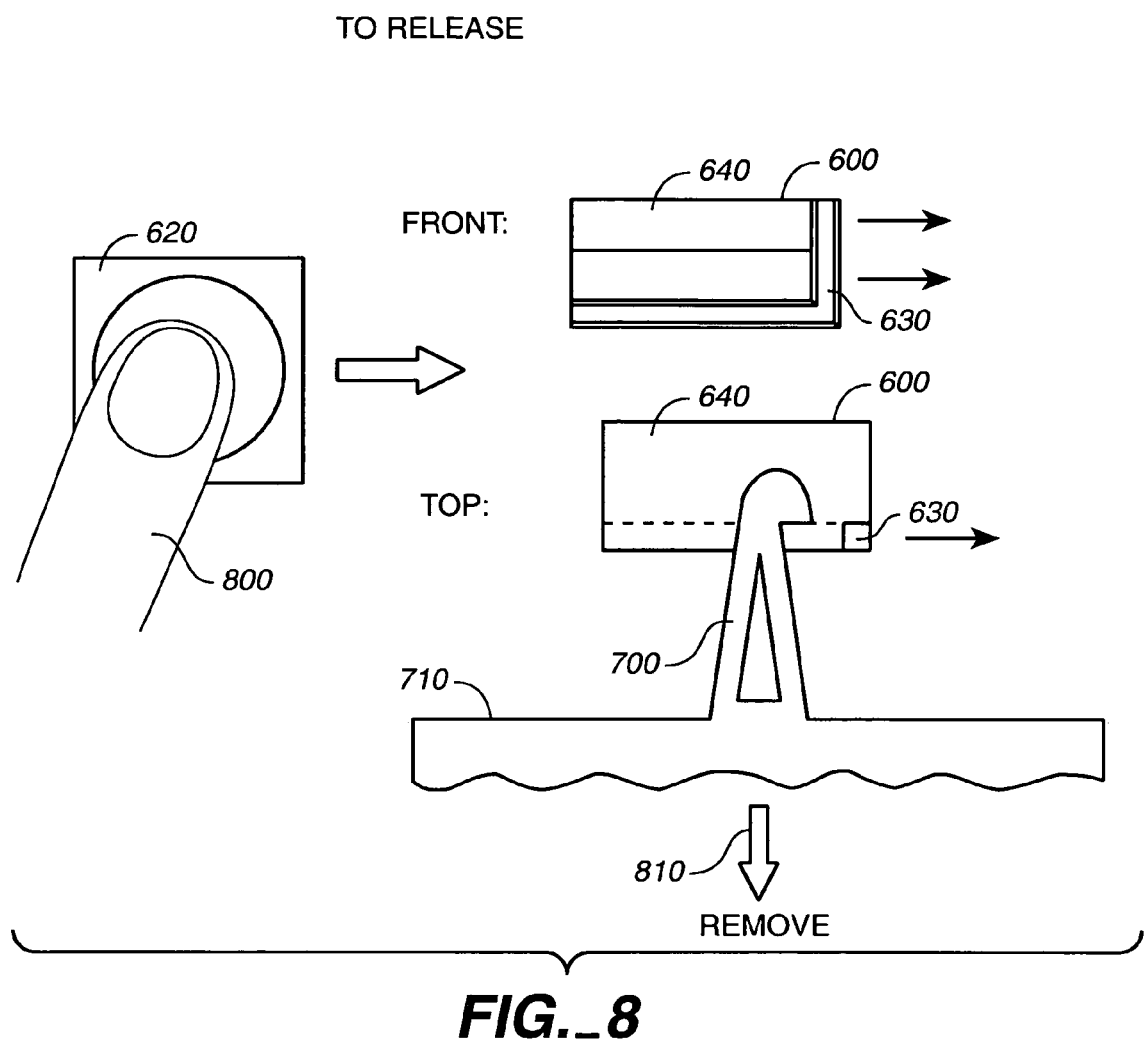
FIG._8

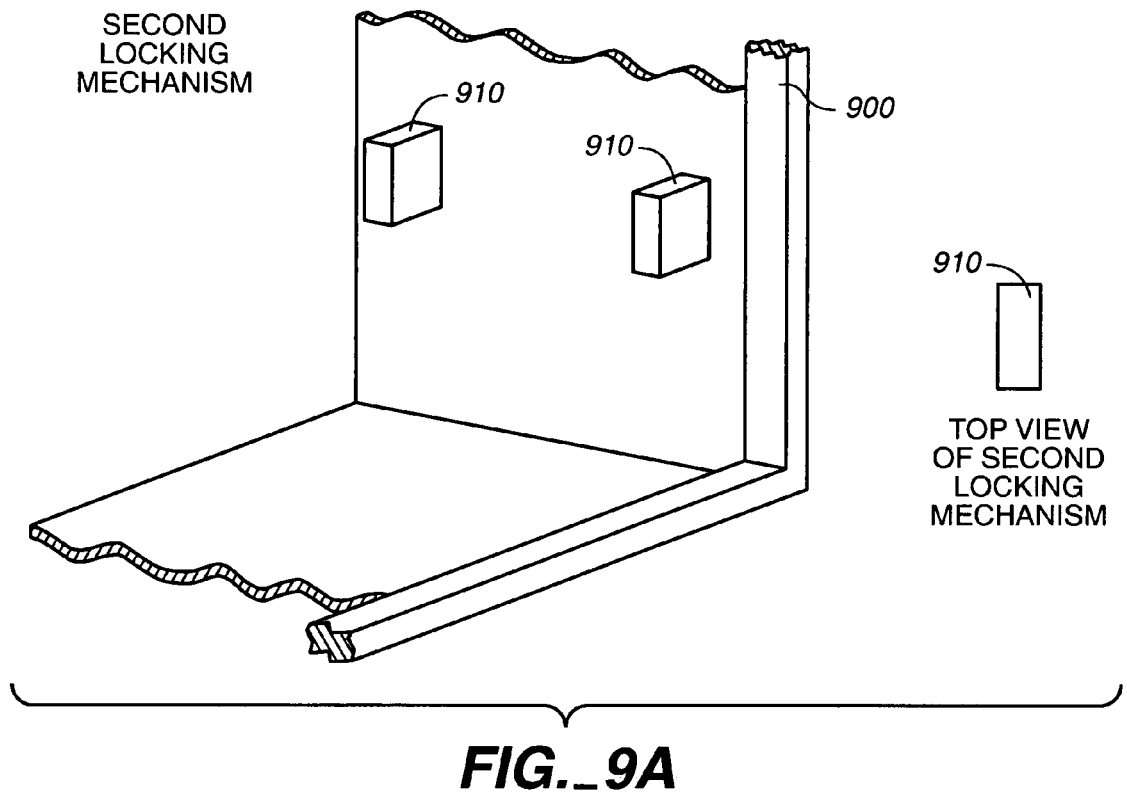
FIG._9A
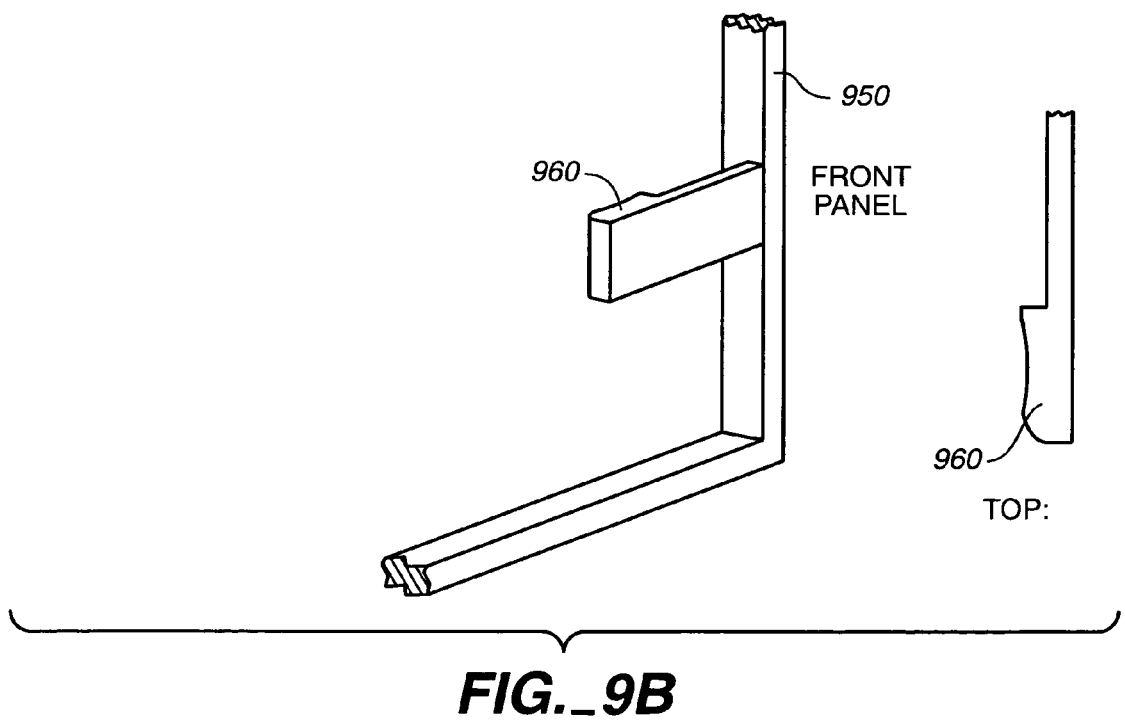
FIG._9B

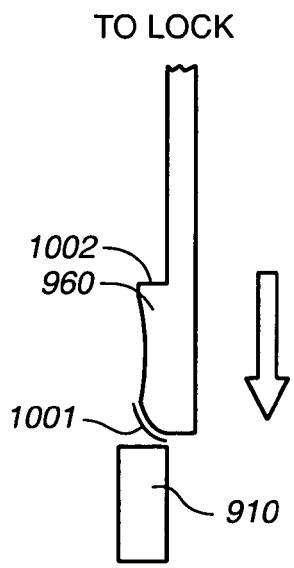
FIG._10A
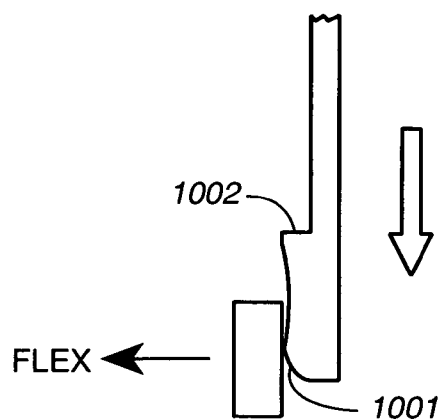
FIG._10B
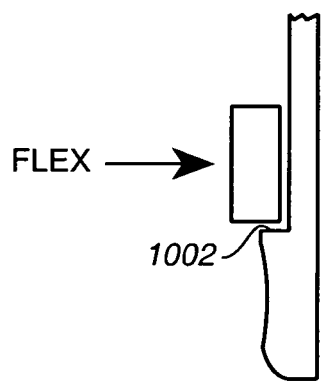
FIG._10C

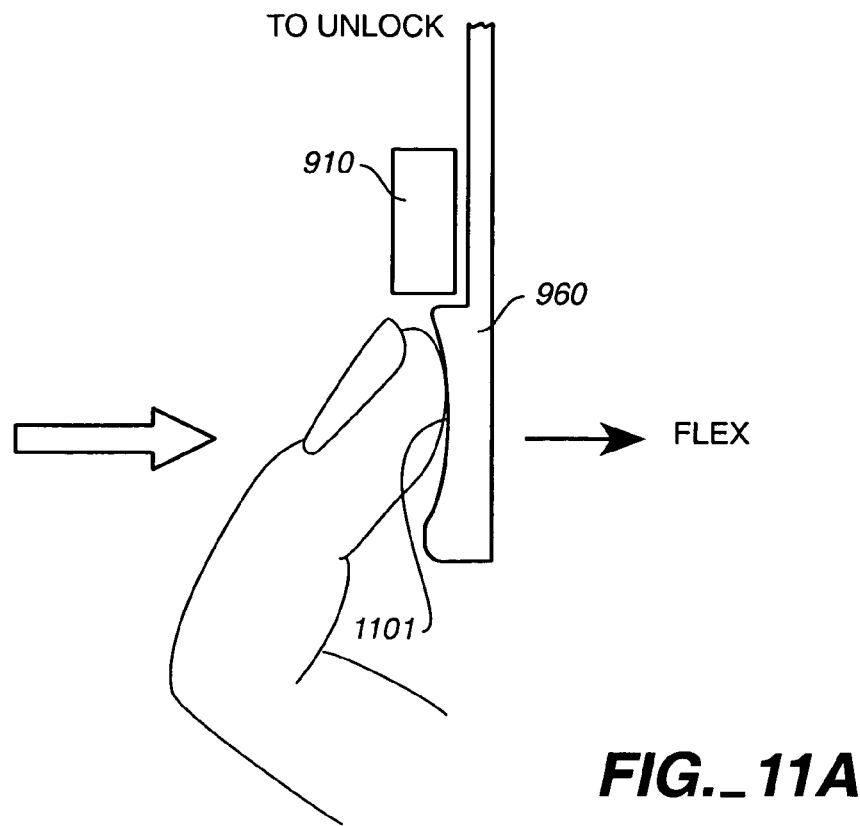
FIG._11A
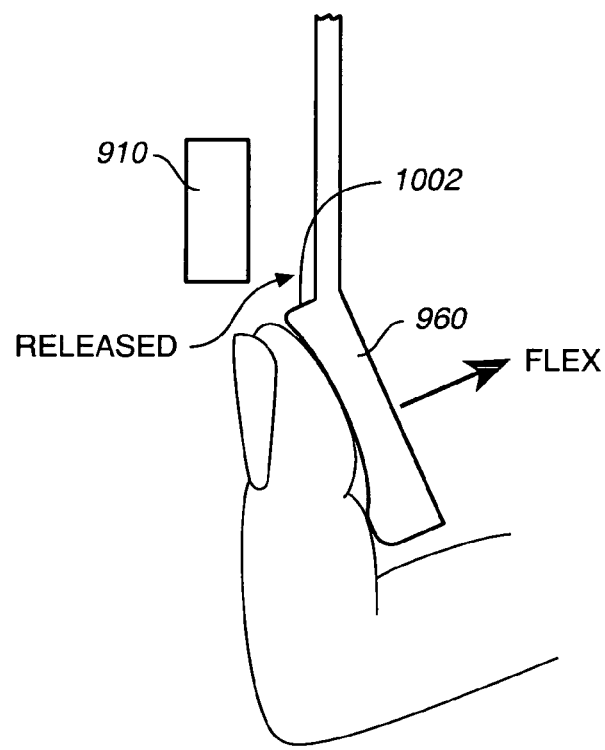
FIG._11B

REMOVABLE FRONT PANEL FOR A COMPUTER HARDWARE CHASSIS

FIELD OF THE INVENTION

Embodiments of the present invention relate to structures for housing computer hardware. More specifically, embodiments of the present invention relate to a computer hardware chassis with a quickly released and easily installed front panel.

BACKGROUND OF THE INVENTION

Personal computer users may on occasion desire to remove, replace or add devices such as hard disk drives, optical drives, etc. to and from their personal computer hard drives. It is essential that such procedures can be performed safely and without complication by the average personal computer user. Personal computer hard drives are typically housed in a chassis, a structure that sits either on the desk or on the floor near the desk. A typical chassis has at least one removable side panel, and a removable front panel for the installation and removal of devices such as optical drives and diskette drives, etc.

Some computer components, such as CD-ROM drives and disk drives for other removable media are typically mounted on the front of a computer system. These computer components are located behind the front panel, and are accessible through openings in the front panel. Some conventional chassis include front panels that can be quickly installed and released. However, these front panels typically lack structural strength, and it is easy for a user to inadvertently knock the front panel off the chassis. Additionally, the locking mechanisms used to hold the front panel in place deteriorate in structural integrity after repeated installation and removal of the front panel. Other systems provide a high-strength connection of the front panel to the chassis but are physically complicated and not intuitive to remove and install. Other systems require at least two people to install and/or remove the front panel from the chassis.

SUMMARY OF THE INVENTION

Embodiments of the present invention, a removable front panel for a computer hardware chassis, are presented. In one embodiment, a computer system housing includes a chassis and a removable front panel that is removably connectable to the chassis. The chassis includes a first locking mechanism, a first structure for engaging and releasing the first locking mechanism, a second locking mechanism and a second structure for engaging and releasing the second locking mechanism. The front panel includes a first mating portion for receipt at the first locking mechanism, wherein the first mating portion is removably engaged with the first locking mechanism, and a second mating portion for receipt at the second locking mechanism, wherein the second mating portion is removably engaged with the second locking mechanism.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is an illustration of a removable front panel on a computer hardware chassis, in accordance with an embodiment of the invention.

FIG. 2 is flowchart depicting a method for installing a removable front panel on a computer hardware chassis, in accordance with an embodiment of the invention.

FIG. 3 is an illustration of a front panel and a computer hardware chassis, in accordance with an embodiment of the invention.

FIG. 4 is flowchart depicting a method for removing a front panel from a computer hardware chassis, in accordance with an embodiment of the invention.

FIG. 5 is another depiction of a front panel and a computer hardware chassis, in accordance with an embodiment of the present invention.

FIG. 6A is an illustration of a top portion of a chassis having a first mechanisms in accordance with an embodiment of the present invention.

FIG. 6B is a close up front view of a first locking mechanism in accordance with an embodiment of the present invention.

FIG. 6C is a close up top view of a first locking mechanism in accordance with an embodiment of the present invention.

FIG. 7A is a close up view of a first mating portion for a first locking mechanism, in accordance with an embodiment of the present invention.

FIG. 7B illustrates a step in locking the first mating portion into the first locking mechanism, in accordance with an embodiment of the present invention.

FIG. 7C illustrates a subsequent step in locking the first mating portion into the first locking mechanism.

FIG. 7D illustrates the engagement of the first mating portion with the first locking mechanism.

FIG. 8 depicts the release of the first mating portion from the first locking mechanism.

FIG. 9A illustrates a chassis having a second locking mechanism in accordance with an embodiment of the present invention.

FIG. 9B illustrates a front panel having a second mating portion in accordance with an embodiment of the present invention.

FIG. 10A depicts a first step in locking a second mating portion and into a second locking mechanism, in accordance with an embodiment of the present invention.

FIG. 10B depicts a subsequent step in locking the second mating portion into the second locking mechanism, in accordance with an embodiment of the present invention.

FIG. 10C illustrates the engagement of the second mating portion with the second locking mechanism.

FIGS. 11A and 11B depict the release of the second mating portion from the second locking mechanism, in accordance with an embodiment of the present invention.

DETAILED DESCRIPTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

One embodiment of the present invention is a front panel that can be easily and intuitively installed on a computer hardware chassis. FIG. 1 depicts the front panel [110] and chassis [150] during installation. The side panel of the chassis [150] has been removed. To install the front panel [110], one aligns the front panel [110] with the front of the chassis [150] by sight and presses the front panel [110] into the chassis [150] until the front panel [110] snaps into place. The indicative "snap(s)" is the sound of the first locking mechanism [120] and/or the second locking mechanism [140] engaging.

The first locking mechanism [120] is a mechanical lock. The first locking mechanism [120] is engaged by pressing the front panel [110] into the chassis [150] until a first mating portion [125] located on the front panel engages with the matching portion of the first locking mechanism [120] on the chassis [150]. In one embodiment of the present invention, the engagement of the first locking mechanism is announced by an audible "snap," so that the user is aware of the engagement. In one embodiment, the first mating portion [125] is situated in a bezel on the front panel [110].

The second locking mechanism [140] is also a mechanical lock. the second locking mechanism [140] is engaged by pressing the front panel [110] into the chassis [150] until a second mating portion [145] located on the front panel [110] engages with the matching portion of the second locking mechanism [140] on the chassis [150]. In one embodiment of the present invention, the engagement of the second locking mechanism is announced by an audible "snap," so that the user is aware of the engagement. In one embodiment, the second mating portion [145] is situated in a bezel on the front panel [110].

Embodiments of the present invention include various numbers of the first [120] and second [140] locking mechanisms. In one embodiment, there is a third locking mechanism [130], and it is possible that any number of locking mechanisms, including just one locking mechanism, could be utilized for quick release/quick installation of the front panel.

FIG. 2 is a flowchart [200] illustrating a method of installing a front panel onto a chassis, in accordance with an embodiment of the present invention. First, a first portion of the front panel is aligned with a first portion of the chassis [210]. In one embodiment, the first portion of the chassis is the top of the front of the chassis, and the first portion of the front panel is the top of the inside of the front panel. Once the proper alignment is achieved, the front panel is pressed into the chassis [220] until a locking mechanism is engaged [230], discussed below. In one embodiment, there are more than one locking mechanisms, and the engagement of the locking mechanism(s) is marked by an audible "snap."

FIG. 3 is a depiction of an installed front panel [310] and chassis [350], side panel removed. In order to remove the front panel [310] from the chassis [350], in accordance with one embodiment of the present invention, a push button [320] must be pressed to release a first locking mechanism, and a pull tab [340] must be pressed to release a second locking mechanism. In one embodiment, the push button [320] and pull tab [340] must be pressed concurrently in order to remove the front panel [310] from the chassis [350]. In another embodiment, the push button [320] is pressed, then the pull tab [340] is pressed. In one embodiment, the push button [320] must be held down while the pull tab [340] locking mechanism is released. In another embodiment, the pull tab locking mechanism [340] must be released before the push button locking mechanism [320].

Other embodiments of the present invention include multiple pull tab locking mechanisms [330], and/or multiple push button locking mechanisms [320]. In one embodiment, all portions of the locking mechanism(s) on the front panel [310] are situated in a bezel on the front panel [310].

FIG. 4 is a flowchart [400] illustrating a method of removing a front panel from a computer hardware chassis, in accordance with an embodiment of the present invention. First, a side panel is removed from the chassis [410]. Then, a button is pressed to release a first locking mechanism [420]. A pull tab is then pressed to release a second locking mechanism [430], and the front panel is removed [440]. In another embodiment of the present invention, the first and second locking mechanisms must be released concurrently. Other embodiments require alternative orders-of-release for the two or more locking mechanisms.

FIG. 5 depicts a removable front panel [510] installed on a computer hardware chassis [550], from a front angle. A side panel has been previously removed in this depiction. A push button [520] located near the top of the side of the chassis [550] is accessible for the user to press and release a first locking mechanism for removing the front panel [510].

FIGS. 6A-6C provide a closer look into the first mechanical lock. FIG. 6A illustrates the top front of a chassis [610]. Located along the top of the chassis are four first locking mechanisms [600]. Embodiments of the present invention permit that any number, including one, of the first locking mechanisms can be employed. The first locking mechanism(s) [600] are released by a user pressing the button [620], in one embodiment located on the side of the chassis. A close up view of the first locking mechanism in FIG. 6B illustrates that the first locking mechanism [600] contains a sliding portion [630] of a certain thickness [635] and a hollow portion [640]. The top view of the first locking mechanism depicted in FIG. 6C illustrates the sliding portion [630] slides laterally along the direction of top face portion of the chassis [610].

FIG. 7A depicts a first mating portion [700] situated protruding from the removable front panel [710], and having a rounded portion [701] and a hook portion [702]. As the front panel [710] is pressed into the chassis, in accordance with a method for installing the removable front panel, the rounded portion [701] of the first mating portion [700] makes contact with the sliding portion [630] of the first locking mechanism [600]. The sliding portion [630] is laterally flexible, and force of the contact with the rounded [701] of the first mating portion [700] is enough to slide the sliding portion [630] laterally as shown in FIG. 7C, allowing the first mating portion [700] to enter the hollow region [640] of the first locking mechanism. Once the front panel [710] is pressed sufficiently far into the chassis, the sliding portion [630] of the first locking mechanism [600] slips back against the hook portion [702] of the first mating portion [700]. An audible snap can be heard as a result of this action. As illustrated in FIG. 7D, in the engaged position, the first mating portion [700] is held securely in place in the first locking mechanism [600] by the sliding portion [630]. The front panel [710] cannot be inadvertently removed from the chassis [610] without a deliberate release procedure, depicted in FIG. 8.

FIG. 8 depicts the release of the first locking mechanism. A user's finger [800] depresses the release button [620] situated on the side of the chassis, as in FIG. 6A. The release button [620] in FIGS. 8 and 6A is the same as the release button [120] depicted in FIG. 1, FIG. 3, and FIG. 5. The first locking mechanism is released by a push button in a preferred embodiment, but it is recognized that the first locking mechanism could be released by another structure known to those skilled in the art. Depressing the release button [800] causes the sliding portion [630] to slide away from the hook portion of the first mating portion [700], as depicted in FIG. 8. Once the sliding portion [630] is sufficiently removed from the first mating portion [700], the front panel [710] can be removed from the chassis. In a preferred embodiment, deliberate action on the part of the user [800] is required to release the first locking mechanism. The first locking mechanism cannot be released inadvertently, under typical usage conditions.

FIG. 9A depicts the inside of the front of a chassis [900] in accordance with an embodiment of the present invention. Portions [910] of the second locking mechanism are situated on the inside front of the chassis [900]. The second locking mechanism [910] can also be found in FIG. 1 and FIG. 3. FIG. 9B shows the inside of the front panel [950] including a second mating portion [960] for the second locking mechanism [910]. This second mating portion [960] can also be seen in FIG. 1.

FIGS. 10A-10C illustrates the process of engaging the second locking mechanism [910] with the second mating portion [960]. As the front panel [950] is pressed into the chassis [900] as a method of installing the front panel in accordance with a preferred embodiment of the present invention, a rounded portion [1001] of the second mating portion [960] slips past the second locking mechanism [910]. The second locking is laterally flexible, such that the force of the contact from the rounded portion [1001] of the second mating portion [960] is enough to push the second locking mechanism to the side, as shown in FIG. 10B. The user continues to push the front panel into the chassis until a hooking portion [1002] of the second mating portion [960] is slipped past the second locking mechanism [910]. At this point, the second locking mechanism [910] flexes back into its original position, as depicted in FIG. 10C, and the second locking mechanism is engaged. In one embodiment, the flexing of the second locking mechanism [910] back to its original position is forceful enough that an audible "snap" can be heard.

The release of the second locking mechanism must be performed deliberately by a user, and is illustrated in FIGS. 11A and 11B. The user presses on a tab region [1101] of the second mating portion [960] to flex the second mating portion [960] away from the second locking mechanism [910], as in FIG. 11A. It is recognized that the structure for releasing the second locking mechanism is a tab region [1101] of the second mating portion in a preferred embodiment, but other structures could be used. Once the hooking portion [1002] the second mating portion [960] is sufficiently free from the second locking mechanism, as in FIG. 11B, the second locking mechanism is released and the front panel can be removed from the chassis.

Embodiments of the present invention permit repeated installation and removal of the front panel to and from the chassis without deterioration of the locking mechanism used to keep the front panel in place. The front panel of the present invention cannot be inadvertently knocked off the chassis. Installation and removal of the front panel requires only a single user. Both installation and removal are intuitive procedures. Embodiments of the present invention provide easy installation and quick release of the front panel while maintaining adequate structural strength of the connection between the front panel and the chassis.

The foregoing description of specific embodiments of the present invention have been presented for purposes of illustration and description. They are not intended to be exhaustive or to limit the invention to the precise forms disclosed, and many modifications and variations are possible in light of the above teaching. The embodiments of were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer hardware housing comprising:
    a chassis comprising:
        a first locking mechanism;
        a first structure for engaging and releasing said first locking mechanism, wherein said first structure is a button located in the interior of said chassis;
        a second locking mechanism, wherein said second locking mechanism is mechanically distinct from said first locking mechanism;
        a second structure for engaging and releasing said second locking mechanism; and
    a removable front panel that is removably connectable to said chassis, said front panel comprising:
        a first mating portion for receipt at said first locking mechanism, wherein said first mating portion is removably engaged with said first locking mechanism, wherein said first locking mechanism is released by pressing said button; and
        a second mating portion for receipt at said second locking mechanism, wherein said second mating portion is removably engaged with said second locking mechanism, wherein said second locking mechanism is released by pressing a mechanical tab that operates in a mechanically independent fashion from operation of said button, and wherein said first and second locking mechanisms are disengaged from said first and second mating portions only when concurrently operated.

2. The chassis described in claim 1, wherein said first locking mechanism is a mechanical lock.

3. The chassis described in claim 1, wherein said second locking mechanism is a mechanical lock.

4. The chassis described in claim 1, wherein said second structure is a tab located in the interior of said chassis.

5. The chassis described in claim 4, wherein said second locking mechanism is released by pressing said tab.

6. The chassis described in claim 1, wherein said first locking mechanism is engaged by aligning a first mating portion of said front panel with a first portion of said chassis and pressing said first mating portion of said front panel into said first portion of said chassis until said first locking mechanism is engaged.

7. The chassis described in claim 6, wherein engagement of said first locking mechanism with said first mating portion is announced by an audible snap.

8. The chassis described in claim 1, wherein said second locking mechanism is engaged by pressing a second mating portion of said front panel into a second portion of said chassis until said second locking mechanism is engaged.

9. The chassis described in claim 8, wherein said engagement of said second locking mechanism with said second mating portion is announced by an audible snap.

10. The chassis described in claim 1, wherein said first locking mechanism is released by pressing said button.

11. A front panel for a computer hardware chassis, said front panel, comprising:
    a first mating portion of a first locking mechanism, wherein said first locking mechanism is engaged by pressing said front panel into said chassis, wherein said first locking mechanism is released by pressing a mechanical button; and a second mating portion of a second locking mechanism, wherein said second locking mechanism is engaged by pressing said front panel into said chassis, and wherein said second locking mechanism is released by pressing a mechanical tab, wherein said second locking mechanism is mechanically distinct from said first locking mechanism and said mechanical tab operates in a mechanically independent fashion from operation of said mechanical button, and wherein said first and second locking mechanisms are disengaged from said first and second mating portions only when concurrently operated.

12. A method for installing a front panel on a computer hardware chassis, wherein said front panel comprises:
a first locking mechanism; and
a second locking mechanism, said method comprising:
aligning a first portion of said front panel with a first portion of said chassis;
pressing said front panel into said chassis to engage said first and second locking mechanisms;
wherein said first locking mechanism is released by pressing a mechanical button located inside said chassis; and
wherein said second locking mechanism is released by pressing a mechanical tab independently from and in addition to pressing said mechanical button, wherein said second locking mechanism is mechanically distinct from said first locking mechanism and said mechanical tab operates in a mechanically independent fashion from operation of said mechanical button, and wherein said first and second locking mechanisms are disengaged from said first and second mating portions only when concurrently operated.

13. The method of claim 12 wherein said engagement of said first and second locking mechanisms is announced by an audible snap.

14. A method for removing a front panel on a computer hardware chassis, wherein said front panel comprises:
a first locking mechanism; and
a second locking mechanism, said method comprising:
removing a side panel of said chassis;
pressing a mechanical button located inside said chassis to release said first locking mechanism;
pressing a mechanical tab independently from and in addition to pressing said mechanical button to release said second locking mechanism while simultaneously pressing said mechanical button to release said first locking mechanism, wherein said second locking mechanism is mechanically distinct from said first locking mechanism and said mechanical tab operates in a mechanically independent fashion from operation of said mechanical button; and
removing said front panel from said chassis.

* * * * *